United States Patent [19]

Yamakami et al.

[11] Patent Number: 5,427,345
[45] Date of Patent: Jun. 27, 1995

[54] APPARATUS FOR DRIVING POWER SEAT FOR VEHICLE

[75] Inventors: Gensaku Yamakami, Niisatomura; Takao Sakamoto, Akishima; Akira Nemoto, Akishima; Shigeru Nakahara, Akishima, all of Japan

[73] Assignees: Mitsuba Electric Manufacturing Co., Ltd., Gunma; Tachi-S Co., Ltd., Tokyo, both of Japan

[21] Appl. No.: 207,680

[22] Filed: Mar. 9, 1994

[30] Foreign Application Priority Data

Jul. 20, 1993 [JP] Japan .................. 5-200418

[51] Int. Cl.⁶ .......................... A45D 19/04
[52] U.S. Cl. .................... 248/394; 248/424; 297/344.17
[58] Field of Search .......... 248/419, 393, 394, 395, 248/429, 430, 424; 297/344.17, 344.1; 76/665 N

[56] References Cited

U.S. PATENT DOCUMENTS

| | | | |
|---|---|---|---|
| 4,470,318 | 9/1984 | Cremer | 297/344.17 X |
| 4,932,290 | 6/1990 | Toyoda | 74/665 N |
| 5,014,958 | 5/1991 | Harney | 248/394 |
| 5,088,841 | 2/1992 | Ikegaya | 248/394 X |
| 5,123,622 | 6/1992 | Matsumoto | 248/394 X |
| 5,150,872 | 9/1992 | Isomura | 74/89.15 X |
| 5,292,164 | 3/1994 | Rees | 248/429 X |
| 5,292,178 | 3/1994 | Loose | 297/344.1 |
| 5,303,881 | 4/1994 | Aronne | 297/344.1 X |
| 5,337,995 | 8/1994 | Satoh | 248/394 X |
| 5,349,878 | 9/1994 | White | 248/429 X |

FOREIGN PATENT DOCUMENTS

| | | | |
|---|---|---|---|
| 725437 | 1/1966 | Canada | 248/394 |
| 3503897 | 8/1986 | Germany | 248/429 |
| 57-36176 | 8/1982 | Japan . | |
| 58-89429 | 5/1983 | Japan . | |
| 61-77538 | 4/1986 | Japan . | |
| 63-159151 | 7/1988 | Japan . | |
| 63-159152 | 7/1988 | Japan . | |
| 63-159153 | 7/1988 | Japan . | |
| 63-159154 | 7/1988 | Japan . | |
| 63-162348 | 7/1988 | Japan . | |
| 63-199138 | 8/1988 | Japan . | |
| 63-199139 | 8/1988 | Japan . | |
| 64-6964 | 2/1989 | Japan . | |
| 1-12695 | 3/1989 | Japan . | |
| 1-42853 | 9/1989 | Japan . | |
| 4-98625 | 8/1992 | Japan . | |
| 2193629 | 2/1988 | United Kingdom | 248/429 |

Primary Examiner—J. Franklin Foss
Attorney, Agent, or Firm—Oliff & Berridge

[57] ABSTRACT

A seat moving apparatus performs adjustments of a seat portion in a longitudinal direction of the vehicle as well as height or tilting adjustments using only one electric motor to decrease the number of elements of the apparatus and to reduce the weight and size of the apparatus. A linkage for driving a seat for a vehicle is disclosed which is arranged in such a manner that first and second nut members are matably attached to operational shafts connected to the single motor. The first nut members are fixed to a floor of the vehicle. The second nut members are attached to the seat through linkages. A clutch body of each nut member can be, by a clutch operation mechanism, selectively switched between a movement state and a non-movement state. In the movement state, a clutch body of the clutch mechanism is positioned at a second shifting position and the nut members are engaged with and longitudinal moved along the threaded operation shafts. In the non-movement state, the clutch body is positioned in a first shifting position and the nut members are not moved during rotation of the operational shafts. The first nut members adjust the positions of the seat in the longitudinal direction and the second nut members adjust the height or tilt of the seat.

16 Claims, 8 Drawing Sheets

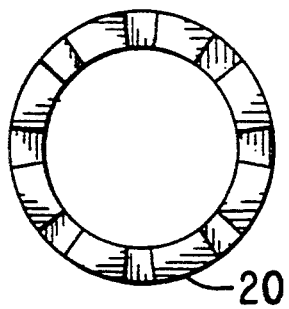
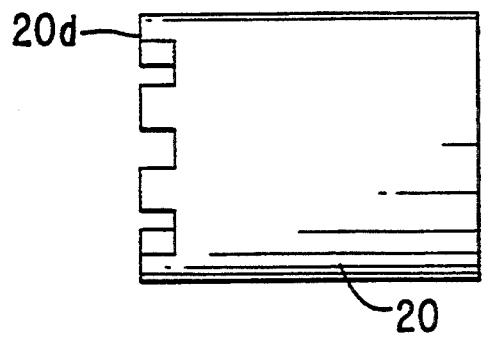
FIG. 10B  FIG. 10A
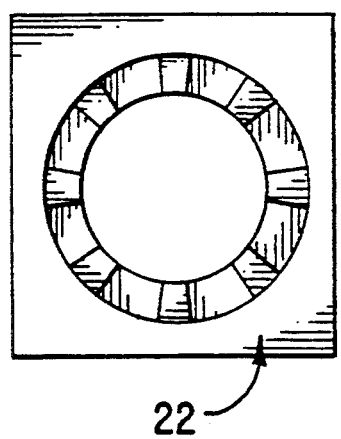
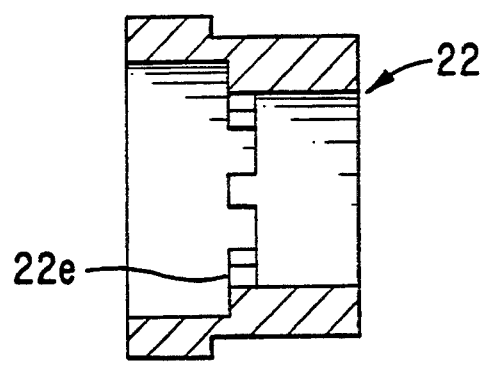
FIG. 11B  FIG. 11A

APPARATUS FOR DRIVING POWER SEAT FOR VEHICLE

BACKGROUND OF THE INVENTION

1. Field of the Invention

The present invention relates to an apparatus for driving a power seat of a vehicle, such as an automobile or a truck.

2. Description of Related Art

As a general rule, a seat attached to an automobile or a truck can be moved longitudinally to fit to the body of a person on the vehicle. In order to further improve the comfortability of the seat, some seats are arranged in such a manner that the height of the front portion and that of the rear portion of the seating portion can individually be adjusted. In this case, a suggestion has been made that electric motors are used to adjust the positions of the seat in the longitudinal direction and the height of the front portion of the seating portion and the rear portion of the same. The foregoing adjustments of the portions of the seat are inevitably performed by corresponding electric motors, each of which transmits power to the corresponding adjustment mechanism because the positions and directions to be adjusted differ from one another. However, the foregoing arrangement encounters undesirable increase in the number of elements, and therefore the structure becomes too complicated. What is worse, the overall size of the apparatus for moving the seat cannot be reduced. Accordingly, spaces for adding other functions to the seat cannot be obtained. Moreover, there arises a problem in that the assembling work becomes too complicated and takes a long time. Therefore, the overall cost cannot be reduced.

SUMMARY OF THE INVENTION

Accordingly, an object of the present invention is to provide an apparatus for driving a power seat of a vehicle that is capable of overcoming the foregoing problems experienced with the conventional technology.

In order to achieve the object, according to an aspect of the present invention, there is provided a linkage for moving a seat for a vehicle comprising: threaded operation shafts rotatably driven by a same motor; first nut members threadably attached to the threaded operation shafts, relative movements of the first nut members during rotation of the threaded operation shafts enabling the seat to be moved in a longitudinal direction of the vehicle; second nut members attached to the threaded operation shafts so that the movement of the second nut members with respect to the threaded operation shafts enables adjustment of the seat in a different direction from the longitudinal direction. Each of the first and second nut members include: a casing having two ends through which one of the threaded operation shafts penetrates; a clutch mechanism within the casing and attached to one threaded operation shaft to provide a first movement state in which the casing is decoupled from rotation of the one operational shaft and a second movement state in which the clutch mechanism is coupled to the casing causing the casing to be engaged with rotation of said one operational shaft; and urging means for urging the clutch mechanism to one of the first and second state.

Other and further objects, features and advantages of the invention will be appear more fully from the following description.

BRIEF DESCRIPTION OF THE DRAWINGS

FIG. 10A is a front view illustrating an example of a clutch body;

FIG. 10B is a side view illustrating another example of the clutch body;

FIG. 11A a cross-sectional view illustrating an example of a clutch receiver; and FIG. 11B is a side view illustrating another example of the clutch receiver.

DETAILED DESCRIPTION OF PREFERRED EMBODIMENTS

Figure 1:
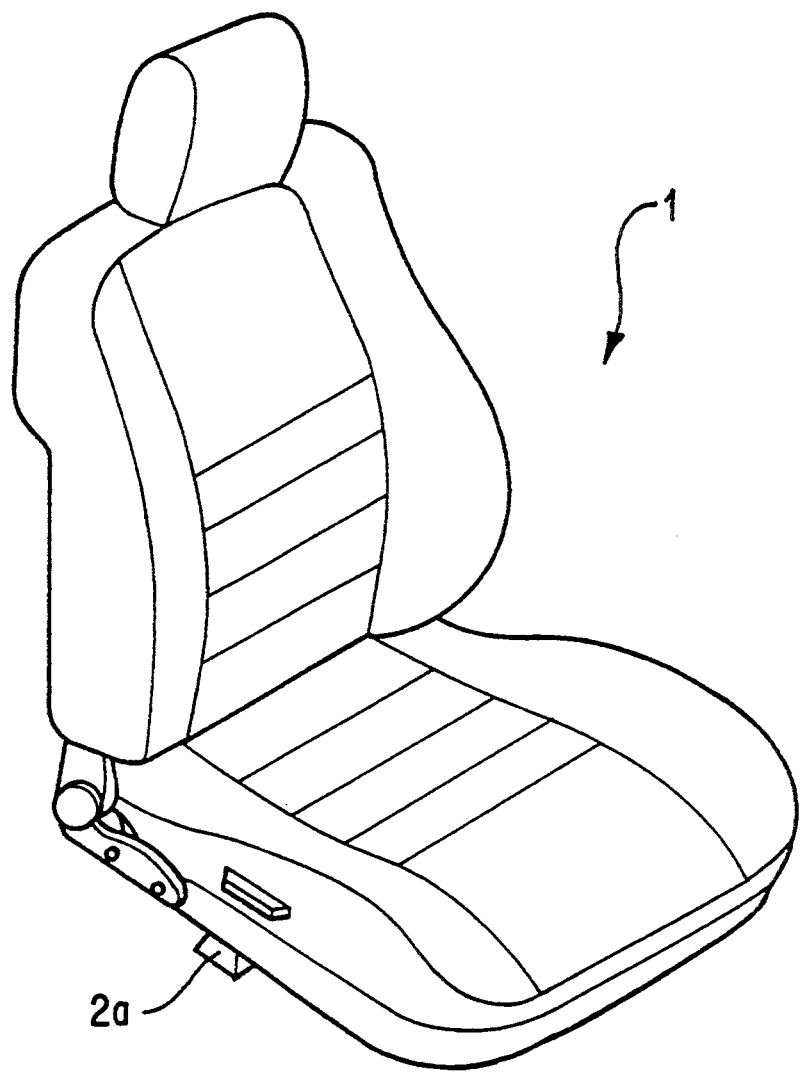
FIG. 1 is a schematic perspective view illustrating a seat.
Figure 2:
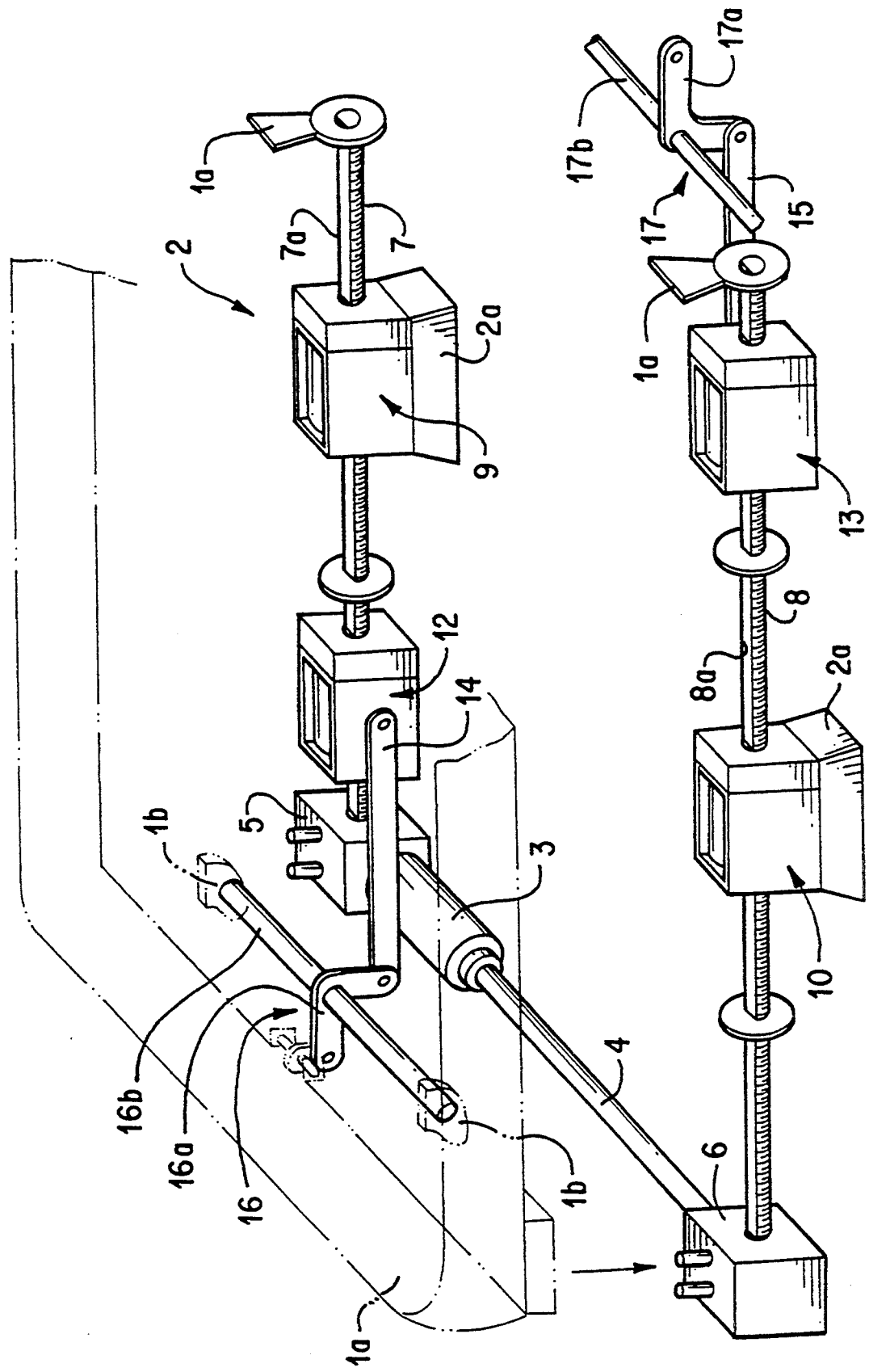
FIG. 2 is a schematic view illustrating an electric apparatus for moving the seat.

An embodiment of the present invention will now be described with reference to the drawings. Referring to the drawings, and in particular to FIGS. 1 and 2, reference numeral 1 represents a seat mounted on a vehicle, such as an automobile or a truck. An electric drive apparatus 2 according to the present invention is disposed below the seat 1 to longitudinally move the seat 1 and to adjust the height of the front portion of the seat 1 and that of the rear portion of the same, individually.

Figure 3:
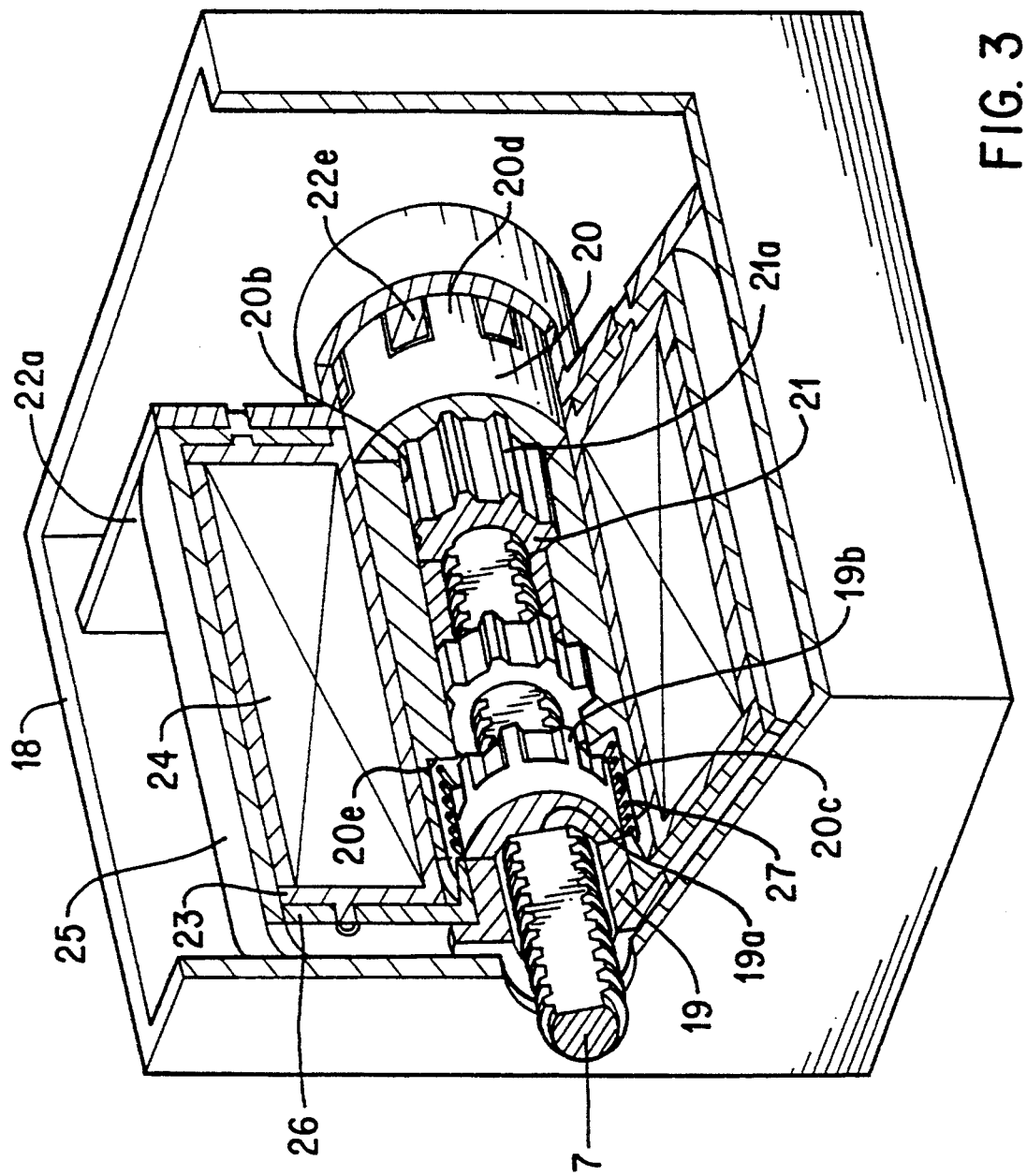
FIG. 3 is a partially-cut perspective view illustrating a nut member.

That is, the electric drive apparatus 2 is formed integrally with the lower portion of the seat 1 in such a way that reduction gear mechanisms 5 and 6, attached to the two lateral ends of an output shaft 4 projecting laterally from an electric motor 3 constituting the electric drive apparatus 2, are integrally secured to the lower surface of the seat 1. Reference numerals 7 and 8 represent first and second threaded operation shafts. The threaded operation shafts 7 and 8 each have an axial line running in the longitudinal direction, the threaded operation shafts 7 and 8 comprising fastening portion 7a and 8a extending in the direction of the axial line and formed on the outer surface thereof. Alternatively, two sides may be chamfered or a recess groove-like structure may be formed in place of the arrangement according to this embodiment. The foregoing threaded operation shafts 7 and 8 are rotated around their axes when the electric motor 3 is rotated, the threaded operation shafts 7 and 8 having rear ends rotatively supported by projecting support members 1a formed at the rear ends of the lower surface of the seat 1. Further, the front ends of the threaded operation shafts 7 and 8 are connected to the reduction gear mechanisms 5 and 6 so that the rotations of the electric motor 3 are, while being decelerated, transmitted to the first and second threaded operation shafts 7 and 8. Further, first nut members 9 and 10 are threadably received by the threaded operation shafts 7 and 8 at intermediate positions of the threaded operation shafts 7 and 8. The first nut members 9 and 10 have lower surfaces formed integrally with support members 2a which in turn are formed integrally with the floor so that the first nut members 9 and 10 are enabled to be longitudinally moved with respect to the threaded operation shafts 7 and 8 when the threaded operation shafts 7 and 8 are rotated. As shown in FIG. 3, when a clutch body 20 is brought to a second shifting position in a manner to be described later, the longitudinal movements of the first nut members 9 and 10 relative to the threaded operation shafts 7 and 8, during rotation of the shafts, move the seat 1 in the longitudinal direction.

Further, second nut members 12 and 13 respectively are threadably attached in front of the first nut member 9 of the first threaded operation shaft 7 and in the rear of the first nut member 10 of the second threaded operation shaft 8. As a result, the second nut members 12 and 13 are longitudinally moved with respect to the threaded operation shafts 7 and 8, during rotation of the shafts, when the clutch body 20 is brought to the second shift position in a manner to be described later. Moreover, the second nut members 12 and 13 respectively are connected to height adjustment mechanisms 16 and 17 through connection rods 14 and 15, the height adjustment mechanisms 16 and 17 being disposed across the seat 1 in the longitudinal direction. That is, the height adjustment mechanisms 16 and 17 are arranged in such a manner that the intermediate portions of operation arms 16a and 17a, each having an end portion supported by the connection rods 14 and 15, are integrally secured to support rods 16b and 17b, the two ends of which are rotatively supported by brackets 1b downwards projecting over the lower surface of the seat 1. Further, the second nut members 12 and 13 are longitudinally moved with respect to the threaded operation shafts 7 and 8 to longitudinally move the connection rods 14 and 15. As a result, other end portions of the operation arms 16b and 17b are vertically moved. The foregoing other end portions of the operation arms 16a and 17a are connected to front and rear portions of the seat 1 so as to vertically adjust the front and rear portions of the seat 1.

It should be noted that the first nut members 9, 10 and the second nut members 12 and 13, which are attached to the corresponding first and second threaded operation shafts 7 and 8, are arranged as follows so that the relative movements with respect to the threaded operation shafts 7 and 8 are switched on or off to select a desired adjustment of the seat 1. Since the foregoing nut members 9, 10, 12 and 13 have the same structure, the first nut member 9 will be described to easily make the description.

Figure 4:
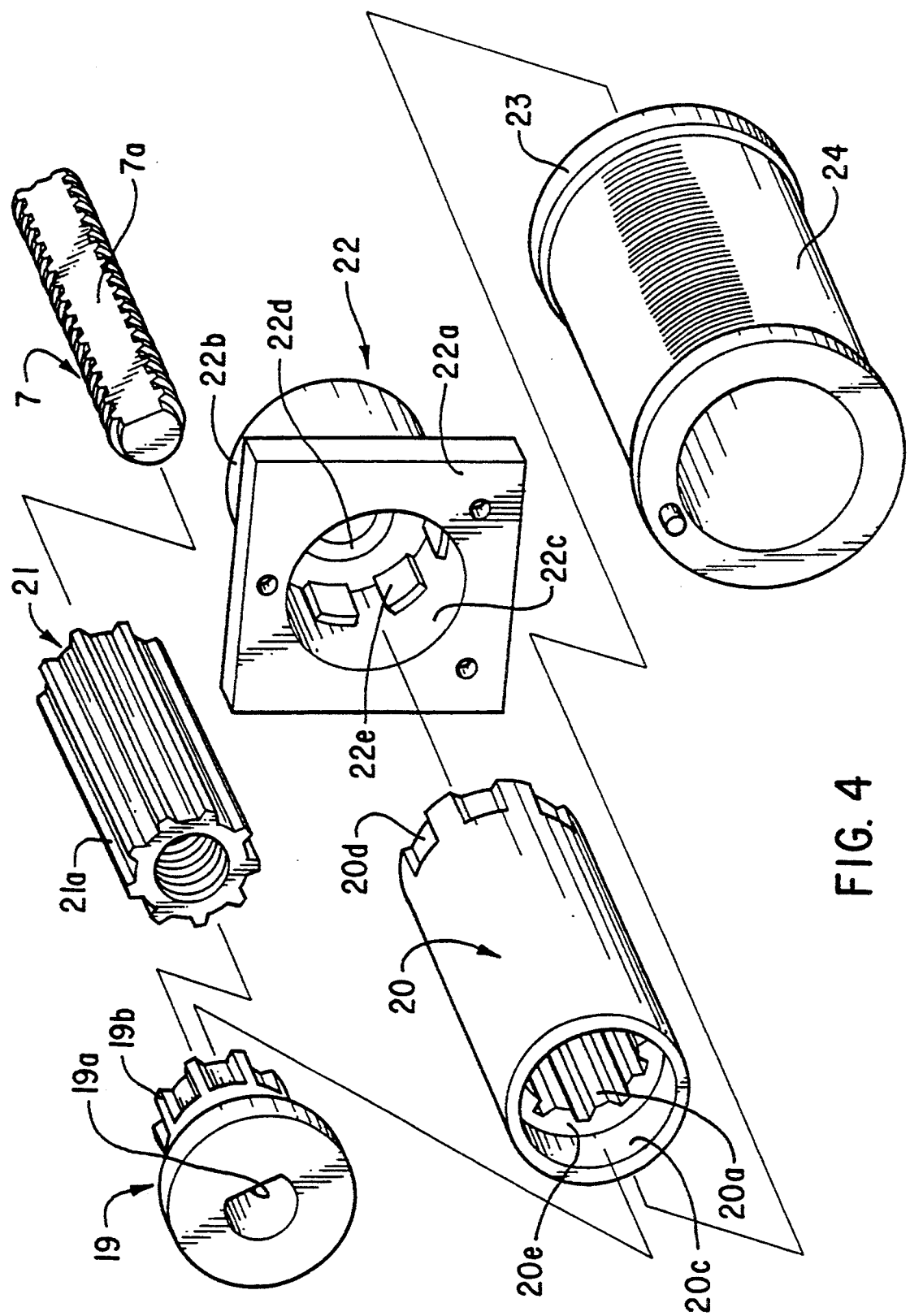
FIG. 4 is an exploded perspective view illustrating the nut member.

As best shown in FIGS. 3 and 4, nut member 9 is accommodated in a casing 18 having a through hole 18a, into which the threaded operation shaft 7 loosely penetrates, so that the casing 18 is made movable with respect to the threaded operation shaft 7. The casing 18 is secured integrally to the bottom portion of the seat 1. The casing 18 includes, at an end thereof, a cylindrical rotary member 19 disposed slidably with respect to the casing 18. The rotary member 19 has, on the inner surface of the cylindrical shape thereof, a joint portion 19a to be joined to joint portion 7a formed in the threaded operation shaft 7. As a result, the rotary member 19 is rotated together with the threaded operation shaft 7 when the threaded operation shaft 7 is rotated around the axis thereof. However, the rotary member 19 is separated from the threaded operation shaft 7 when the rotary member 9 is moved in the direction of the axis because the threaded operation shaft 7 is loosely inserted into the rotary member 19. Further, a first clutch receiving portion 19b is formed on the outer surface of another end of the rotary member 19, the first clutch receiving member 19b being detachably engaged to a first clutch joint portion 20a formed in the clutch body 20 to be described later.

Figure 5:
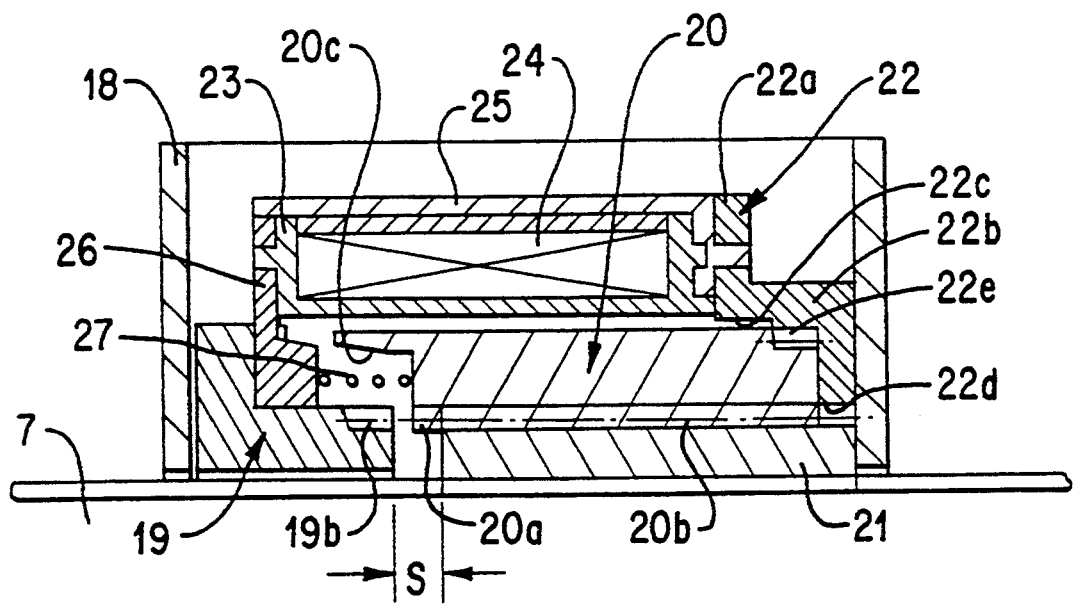
FIG. 5 is a schematic cross-sectional view illustrating a state where the nut member is moved.
Figure 6:
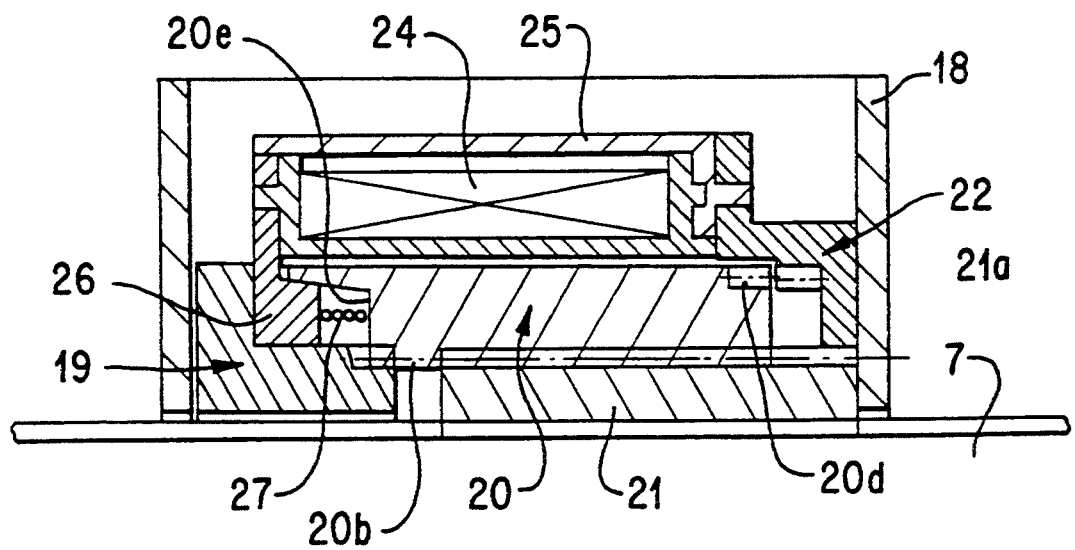
FIG. 6 is a schematic cross-sectional view illustrating a state where the nut member is not moved.

In addition, a nut body 21 is disposed adjacent to the other end of the rotary member 19 at interval S (FIG. 5) in such a manner that the nut body 21 penetrates and engages with the threaded operation shaft 7. The nut body 21 has a plurality of joining grooves 21a facing the direction of the axis thereof and distributed about a periphery of the nut body.

It should be noted that the clutch body 20 is arranged to serve as a plunger to be described later and formed into a cylindrical shape, the clutch body 20 having another end formed into an internal cylinder having a small diameter. The foregoing end portion of the clutch body 20 has joining female grooves 20b to be engaged to the joining grooves 21a so that the clutch body 20 is rotated integrally with the nut body 21 in the axial direction and that the clutch body 20 can be individually moved in the axial direction.

A half portion of the clutch body 20 is formed into an internal cylinder portion 20c having a large diameter to receive loosely the rotary member 19. Therefore, when the clutch body 20 is moved to either end as described later, the end of the joining female groove 20b is detachably engaged to first clutch receiving portion 19b formed on the rotary member 19. Thus, the end of the joining female groove 20b is formed into the first clutch joining portion 20a.

The casing 18 has a clutch receiver 22 at the other end thereof, the clutch receiver 22 having, at an end thereof, a rectangular plate-like flange portion 22a formed integrally with the casing 18 and, at another end thereof, a cylindrical portion 22b in such a manner that the flange portion 22a and the cylindrical portion 22b are formed integrally. In addition, the clutch receiver 22 has, at an end thereof adjacent to the plate-like flange portion 22a, a large-diameter internal cylindrical portion 22c which receives the clutch body 20 and, at the other end thereof adjacent to the cylindrical portion 22b, a small-diameter internal cylindrical portion 22d which loosely receives the nut body 21. The large-diameter internal cylindrical portion 22c has, on the inner surface of a rear portion thereof, a second clutch receiving portion 22e which can be detachably engaged to a second clutch joining portion 20d formed at the end of the outer surface of the clutch body 20 adjacent to the clutch body 20.

When the clutch body 20 is moved to the other end adjacent to the clutch receiver 22 and therefore the second clutch joining portion 20d is engaged to the second clutch receiving portion 22e, the clutch body 20 is integrated with the casing 18 in a direction around the axis. Thus, the rotations of the clutch body 20 around the axis of the threaded operation shaft 7 can be prevented, while the relative movement of the clutch body 20 in the axial direction is permitted.

It should be noted that the engagement made between the second joining portion 20d of the clutch body 20 and the second clutch receiving portion 22e of the clutch receiver 22 is not limited to that shown in FIG. 4. Another arrangement may be employed in which the second clutch joining portion 20d is formed into a chrysanthemum-shape as shown in FIGS. 10A and 10B and the second clutch receiving portion 22e is also formed into a chrysanthemum-shape as shown in FIGS. 11A and 11B to be engaged/disengaged to each other. The necessity is that the clutch body 20 is able to detachably engage with the clutch receiving portion 22.

Reference numeral 23 represents a coil bobbin which is integrally included in the casing 18 and around which an exciting coil 24 is wound. The coil bobbin 23 accommodates the clutch body 20 in such a manner that the outer surface of the clutch body 20 is able to slide on the coil bobbin 23. Reference numeral 25 represents a yoke having an opening formed on either side thereof, and 26 represents a yoke plate for closing the opening formed in the yoke 25. A clutch spring 27 is disposed between the yoke plate 26 and a stepped portion 20e formed between the large-diameter internal cylinder portion 20c and the small-diameter internal cylinder of the clutch body 20. The clutch body 20 receives the urging force of the clutch spring 27 when no electric power is supplied to the exciting coil 24. Therefore, the first clutch joining portion 20a of the clutch body 20 adjacent to the rotary member 19 is positioned apart from the first clutch receiving portion 19b, while the second clutch joining portion 20d opposing the first clutch joining portion 20a is positioned at a second shifting position at which the second clutch joining portion 20d is engaged to the second clutch receiving portion 22e.

When electric power is supplied to the exciting coil 24 by operating a switch (omitted from illustration) to actuate the exciting coil 24, the clutch body 20 is moved to the end so that the first clutch joining portion 20a is engaged to the first clutch receiving portion 19b against the urging force of the clutch spring 27. On the other hand, the second clutch joining portion 20d opposing the first clutch joining portion 20a is positioned at a first shifting position at which the second clutch joining portion 20d is positioned apart from the second clutch receiving portion 22e. Thus, a clutch operation mechanism is constituted.

When the threaded operation shaft 7 is rotated in a state where the second clutch joining portion 20d is positioned apart from the first shifting position, the clutch body 20 is rotated together with the rotary member 19 and the same is separated from the clutch receiver 22. As a result, the clutch body 20 and the rotary member 19 are rotated together (integrally rotated) with the threaded operation shaft 7. This provides a non-movement state in which movement of the seat 1 is inhibited. If the threaded operation shaft 7 is rotated when the second clutch joining portion 20d is positioned at the second shifting position, the clutch body 20 is freed from the rotary member 19 and the same is integrated with the clutch receiver 22. As a result, a movement state is provided where the seat 1 can be moved.

The thus-constituted embodiment of the present invention enables the longitudinal position and the height in the longitudinal direction of the seat 1 to be adjusted. Further, enablement of individual ones of the second nut members allows tilting of the seat. If the height of the front portion of the seat 1 is adjusted for example, that is the height of the front of the seat is moved relative to the height of the rear of the seat (tilting), the simple necessity must be satisfied that power supply to the exciting coil 24 provided for the second nut member 12 is interrupted to separate the clutch body 20 from the rotary member 19. As a result, the integral rotation of the clutch body 20 with the threaded operation shaft 7 is inhibited so that the longitudinal height of the seat 1 is adjusted to follow the rotations of the threaded operation shaft 7 caused from the forward/rearward rotations of the electric motor 3.

When the longitudinal position of the seat 1 is adjusted, it is necessary to simply bring the first nut members 9 and 10 into the movement state and to bring the residual nut members 12 and 13 into the non-movement state. Additionally, bringing both first nut members into the non-movement state and both second nut members into the movement state allows height adjustment of the whole seat.

As described above, the present invention enables the longitudinal position and the height of the seat 1 to be automatically adjusted by electric power. A desired adjustment can be selected by switching the corresponding clutch operation means. Therefore, the plural adjustment mechanisms can be controlled by the rotations of one electric motor. Therefore, the necessity of using an exclusive electric motor for each adjustment mechanism can be eliminated. While an electric motor is described in a preferred embodiment, alternative motors such as pneumatic, hydraulic, or manually driven power sources can be substituted.

The invention allows a great number of elements required to form the adjustment mechanisms to significantly be used commonly. Therefore, the number of the elements can be decreased, the weight and the size of the apparatus can be reduced, and the structure can be simplified. Further, the assembly work can be simplified and, accordingly, the cost can be reduced.

Moreover, the arrangement of the clutch operating mechanisms of the present invention for operating the clutch body 20 are disposed in parallel in the radial direction of the clutch body 20 to switch the nut members between the movement state and the non-movement state. Therefore, axial enlargement that would undesirably shorten the effective distance of movement experienced with a structure comprising clutch operation mechanisms disposed in series in the axial direction can effectively be prevented. As a result, a satisfactory distance of movement can be realized.

Figure 7:
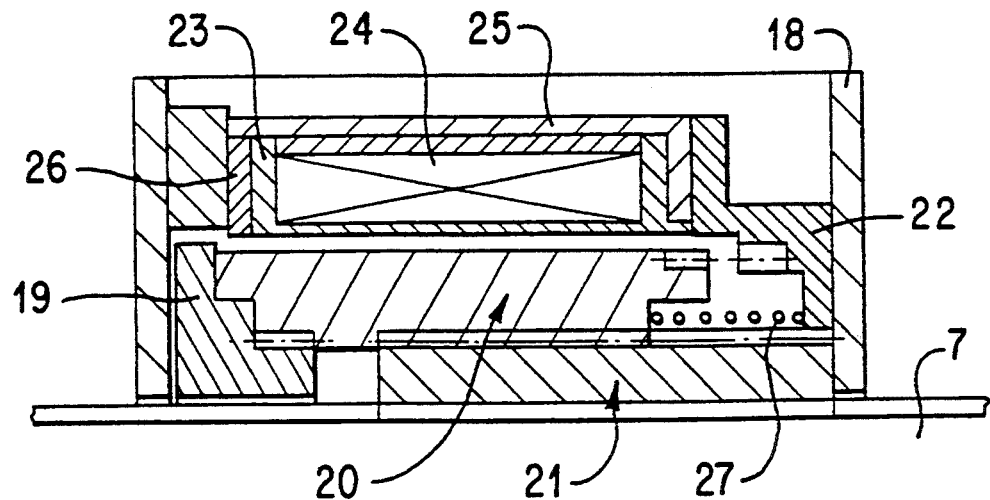
FIG. 7 is a schematic cross-sectional view illustrating another example of a state where the nut member is not moved.

It can be expected that the foregoing structure encounters a problem with engagement and disengagement of the clutch body 20 due to disconnection or the like of the exciting coil 24. In the foregoing state, the nut member 9 is moved when the threaded operation shaft 7 is rotated. Accordingly, the nut member 9 may be constituted in such a manner that the first clutch joining portion 20a and the first clutch receiving portion 19b are engaged to each other as shown in FIG. 7 when no electric power is supplied. In this case, an advantage can be realized in that electric power can be supplied to only the exciting coil 24 to which electric power is needed to move the corresponding nut member. Another structure may be employed in which the connection/disconnection of the clutch operation means is made inversely in such a manner that the nut members 9 and 10 for adjusting the longitudinal movement of the seat 1 are brought into the movement state when no electric power is supplied and that the residual nut members 12 and 13 are brought into the non-movement state when no electric power is supplied. In this case, even if no electric power can be supplied to any of the exciting coils 24 due to a failure or the like, at least the adjustment of the longitudinal movement of the seat 1 can be performed by rotating the motor. Therefore, a further preferred advantage can be realized. That is, the driver can adjust the longitudinal position of the seat, allowing the foot of the driver to reach the pedal or move the knees away from the dash board even if the exciting coils fail.

The engagement between the rotary member of the clutch body and the clutch receiver may, of course, be selected from a variety of clutch means exemplified by a dog clutch method, a claw clutch method and a chrysanthemum-shape clutch method.

Figure 8:
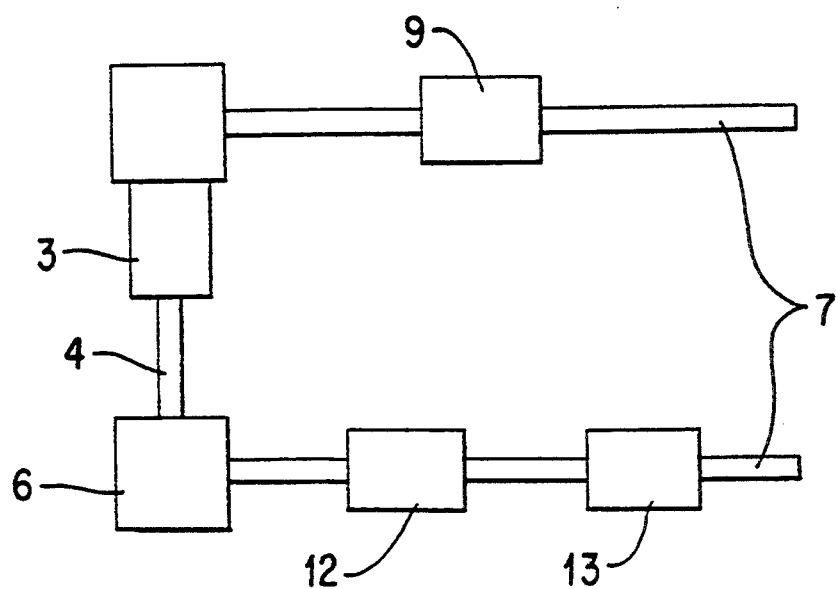
FIG. 8 is a schematic view illustrating an example of the arrangement of the electric drive apparatus.
Figure 9:
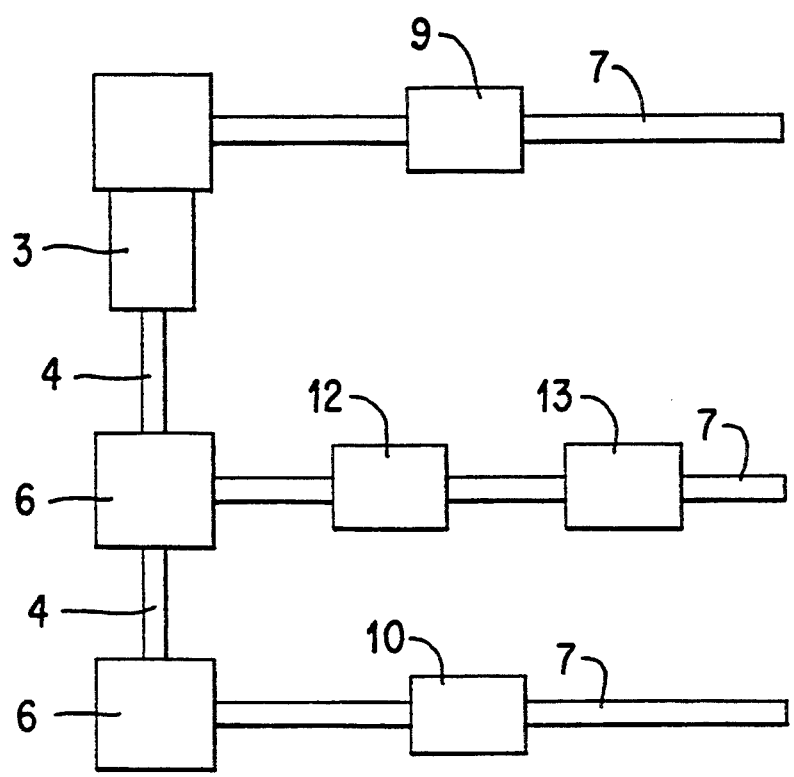
FIG. 9 is a schematic view illustrating another example of the arrangement of the electric drive apparatus.

The arrangement of the electric drive apparatus using the foregoing nut members and the threaded operation shaft is not limited to the foregoing embodiment and a variety of structures may be employed. For example, a structure may be employed which is arranged in such a manner that the nut member 9 for adjusting the longitudinal movement is attached to either of the two threaded operation shafts 7 and the nut members 12 and 13 for adjusting the height in the longitudinal direction are attached to the residual threaded operation shaft 7 as shown in FIG. 8. Another structure may be employed in which three threaded operation shafts 7 are disposed, the nut members 12 and 13 for adjusting the height in the longitudinal direction are attached to the central threaded operation shaft 7 and the nut members 9 and 10 for adjusting the longitudinal movement are respectively attached to the threaded operation shafts 7 disposed on the two sides as shown in FIG. 9. The structures as shown in FIGS. 8 and 9 enable an advantage to be realized in that the threaded operation shaft can be shortened as compared with the first embodiment.

Since the present invention is constituted as described above, the plural types of movement adjustments of the seat, such as the adjustment of the longitudinal position, can be performed by selecting the engagement between the clutch body and the rotary member or that between the same and the clutch receiver. As a result, only one motor 3 enables multiple position adjustments to be performed. Therefore, the necessity of using corresponding electric motors for each adjustment can be eliminated. Accordingly, the number of elements can be decreased and the weight and the size of the apparatus can effectively be reduced.

Furthermore, the arrangement, in which the clutch operation means for switching the nut members for realizing the multiple position adjustments between the movement state and the non-movement state are disposed in parallel in the radial direction of the clutch body, enables a satisfactorily large distance of the movement to be realized.

Although the invention has been described in its preferred form with a certain degree of particularly, it is understood that the present disclosure of the preferred form can be changed in the details of construction and the combination and arrangement of parts may be resorted without departing from the spirit and the scope of the invention as hereinafter claimed.

What is claimed is:

1. A linkage for moving a seat for a vehicle comprising:

threaded operation shafts rotatably driven by a same motor, each of said threaded operation shafts having a joining portion formed in an outer surface thereof;

a first nut member attached to one of said threaded operation shafts, relative movements of said first nut member during rotation of said threaded operation shafts enabling the seat to be moved in a longitudinal direction of the vehicle;

second nut members attached to said threaded operation shafts so that the movement of said second nut members with respect to said threaded operation shafts enables adjustment of the seat in a different direction from said longitudinal direction;

each of said first nut member and said second nut members including:

a casing having two ends through which one of said threaded operation shafts penetrates;

a rotary member disposed on one of the two ends of said casing, said rotary member being disposed around said one threaded operation shaft and engaged with said joining portion of said one threaded operation shaft to allow rotation with said one threaded operation shaft about a longitudinal axis of said one operation shaft but disengaged from threads of said one threaded operation shaft to prevent axial movement of said rotary member along the longitudinal axis during rotation of said operational shafts, said rotary member having a first clutch receiving portion on an end thereof;

a nut body threaded on said one threaded operation shaft and disposed adjacent to said end of said rotary member;

a clutch body movably attached to an outer peripheral surface of said nut body, said clutch body being rotatable with said nut body when said nut body is rotated around the longitudinal axis and axially movable relative to said nut body, said clutch body having at one end thereof a first clutch joining portion detachably engaged to said first clutch receiving portion and at a second end thereof a second clutch joining portion;

a clutch receiver integrally attached to the other end of said casing and penetrated by said one threaded operation shaft, said clutch receiver having a second clutch receiving portion to which said second clutch joining portion is detachably engaged; and clutch urging means acting on said clutch body to move said clutch body axially causing said clutch body to switch between a non-movement state in which said clutch joining portion is engaged to said first clutch receiving portion and a movement state in which said second clutch joining portion is engaged to said second clutch receiving portion.

2. The linkage of claim 1, wherein said urging means is a spring.

3. The linkage of claim 1, wherein said urging means is an exciting coil.

4. The linkage of claim 3, wherein said exciting coil is coaxially arranged around said nut body.

5. The linkage of claim 1, wherein a spring forms part of said urging means for urging said clutch mechanism to one of said first movement state and said second movement state and an exciting coil forms part of said urging means for overcoming a force exerted by said spring and urging said clutch mechanism to the other of said first movement state and said second movement state.

6. The linkage of claim 1, wherein said first clutch receiving portion includes a plurality of longitudinally extending grooves separated by ridges and said first clutch joining portion has a corresponding complementary plurality of grooves separated by ridges for mating with said first clutch receiving portion.

7. The linkage of claim 1, wherein said nut body has a plurality of longitudinally extending grooves separated by ridges, the grooves and ridges extending an entire longitudinal length of said nut body.

8. The linkage of claim 7, wherein said first clutch receiving portion includes a plurality of longitudinally extending grooves separated by ridges corresponding to said grooves and ridges of said nut body and said first clutch joining portion has a corresponding complementary plurality of grooves separated by ridges for mating with said first clutch receiving portion and said grooves and ridges of said nut body, said grooves and ridges of said first clutch joining portion extending an entire length of said clutch body.

9. The linkage of claim 1, wherein said first nut member is attached on the side of a floor of the vehicle and the second nut members are attached to the seat through height adjustment mechanisms.

10. The linkage of claim 1, wherein a plurality of said second nut members are attached to the seat through height adjustment mechanisms and movement of one of said second nut members along said operation shaft relative to the other said second nut members tilts the seat relative to a floor of the vehicle.

11. The linkage of claim 1, wherein two of said second nut members are attached to the seat through height adjustment mechanisms and movement of both second nut members in a same direction along said operation shaft causes raising or lowering of the seat relative to a floor of the vehicle.

12. The linkage of claim 1, wherein said second nut members are located on a same operational shaft.

13. The linkage of claim 1, wherein three substantially parallel, spaced operational shafts are provided, said second nut members being provided on a central one of said operational shafts and two first nut members being provided, one on each of the remaining two operational shafts.

14. A linkage for moving a seat for a vehicle comprising:
threaded operation shafts rotatably driven by a same motor, each of said threaded operation shafts having a joining portion formed in an outer surface thereof;
a first nut member attached to one of said threaded operation shafts, relative movements of said first nut member during rotation of said threaded operation shafts enabling the seat to be moved in a longitudinal direction of the vehicle;
second nut members attached to said threaded operation shafts so that the movement of said second nut members with respect to said threaded operation shafts enables adjustment of the seat in a different direction from said longitudinal direction;
each of said first nut member and said second nut members including:
a casing having two ends through which one of said threaded operation shafts penetrates;
a rotary member disposed on one of the two ends of said casing, said rotary member being disposed around said one threaded operation shaft and engaged with said joining portion of said one threaded operation shaft to allow rotation with said one threaded operation shaft about a longitudinal axis of said one operation shaft but disengaged from threads of said one threaded operation shaft preventing axial movement of said rotary member along the longitudinal axis due to rotation of said operational shafts, said rotary member having a first clutch receiving portion on an end thereof;
a nut body threaded on said one threaded operation shaft and disposed adjacent to said end of said rotary member;
a clutch body movably attached to an outer peripheral surface of said nut body, said clutch body being rotatable with said nut body when said nut body is rotated around the longitudinal axis and axially movable relative to said nut body, said clutch body having at one end thereof a first clutch joining portion detachably engaged to said first clutch receiving portion and at a second end thereof a second clutch joining portion;
a clutch receiver integrally attached to the other end of said casing and penetrated by said one threaded operation shaft, said clutch receiver having a second clutch receiving portion to which said second clutch joining portion is detachably engaged; and
clutch urging means located coaxially around said clutch body, said clutch urging means moving said clutch body axially between a non-movement state in which said clutch joining portion is engaged to said first clutch receiving portion and a movement state in which said second clutch joining portion is engaged to said second clutch receiving portion.

15. The linkage of claim 14, wherein said clutch urging means is an exciting coil.

16. The linkage of claim 14, wherein said first nut member is in the movement state when no power is supplied to said exciting coil and said second nut members are in the non-movement state when no power is supplied to said exciting coil.

* * * * *